United States Patent [19]

Murakami

[11] 4,129,755
[45] Dec. 12, 1978

[54] FRAME SYNCHRONIZING SYSTEM FOR TDMA RADIO COMMUNICATIONS

[75] Inventor: Shuji Murakami, Tokyo, Japan

[73] Assignee: Nippon Electric Co., Ltd., Tokyo, Japan

[21] Appl. No.: 849,363

[22] Filed: Nov. 7, 1977

[30] Foreign Application Priority Data

Nov. 11, 1976 [JP] Japan .................................. 51-136050

[51] Int. Cl.² ............................................... H04J 3/06
[52] U.S. Cl. ................................... 179/15 BS; 325/4
[58] Field of Search ........... 179/2 EB, 15 BS, 15 AQ; 325/4

[56] References Cited

U.S. PATENT DOCUMENTS 3,764,914  10/1973  Cox .................................. 179/2 EB

Primary Examiner—David L. Stewart
Attorney, Agent, or Firm—Sughrue, Rothwell, Mion, Zinn and Macpeak

[57] ABSTRACT

A frame synchronizing equipment is disclosed which enables the TDMA technique to be used in a mobile communication system or a small-scale stationary communication system and requires no reference station. Plural radio channels separated from one another on a time-sharing basis are monitored upon initiation of a call by one of plural radio stations to detect the presence of a unoccupied channel. When an occupied channel followed by an unoccupied channel is detected, a pulse is extracted in a frame period synchronized with a burst signal of the occupied channel immediately preceding the unoccupied channel. A phase synchronization oscillating circuit generates a frame synchronization signal in synchronism with the extracted pulse.

4 Claims, 11 Drawing Figures

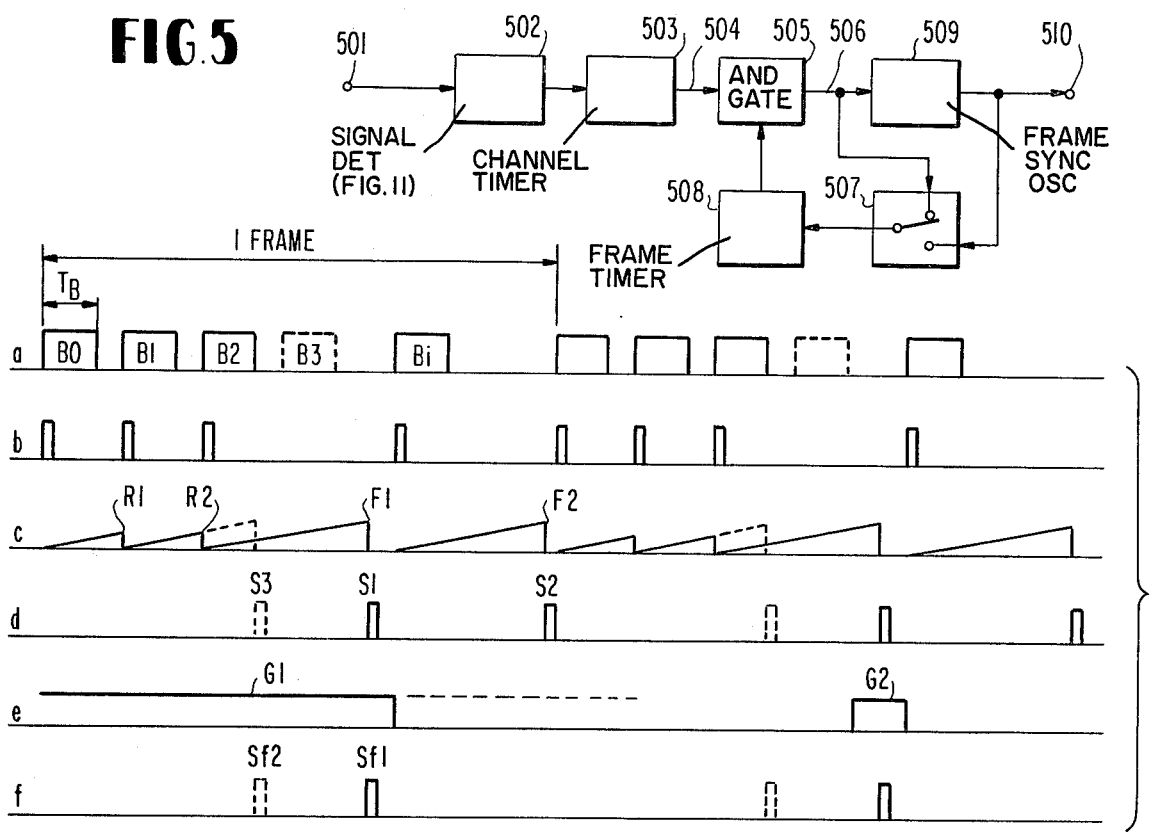
FIG.5
FIG.6
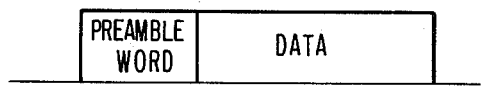
FIG.7
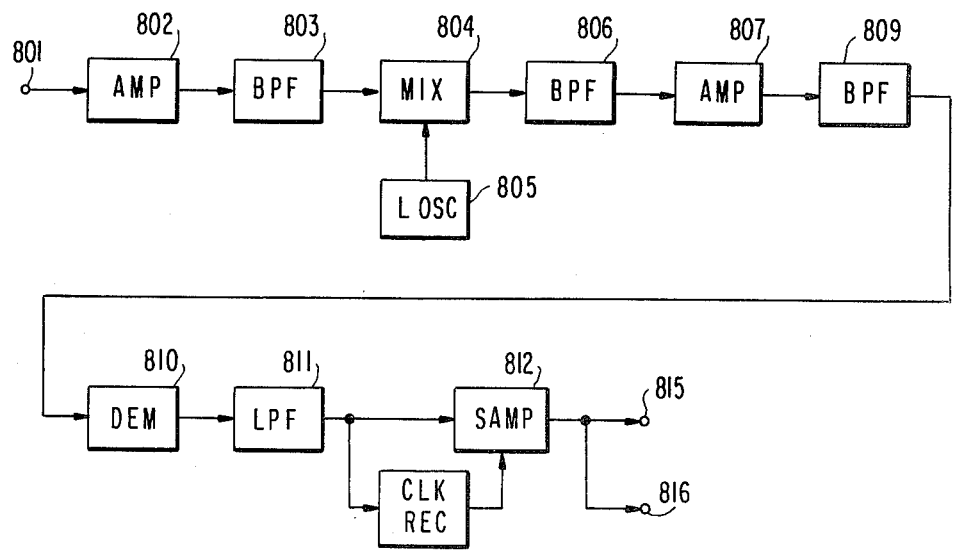
FIG.8

FRAME SYNCHRONIZING SYSTEM FOR TDMA RADIO COMMUNICATIONS

BACKGROUND OF THE INVENTION

This invention relates to a frame synchronizing method and an equipment for use in a TDMA (time-division multiple-access) radio communication system which, having plural radio communication channels between plural radio stations, separates the channels from one another on a time-sharing basis and permits acquisition of a channel without using a particular reference station.

In such a TDMA system adopted as one of the multiple-access techniques for communications channels, the same frequency is commonly used, and n channels are formed by dividing the time axis as illustrated in FIG. 1 into time slots No. 0 through No. n-1 (where n is an integer) and by transmitting information with independent access to each of these n time slots constituting a frame. In order that these time slots can be used as independent communication channels, they are set so as not to overlap each other. This setting manipulation can be readily done under the condition that one of the radio stations controls all the communication channels as a reference station by inserting a frame synchronization (sync) signal on the time axis using a sync signal generator provided there.

For details of the TDMA system, reference is made to Sekimoto et al, "A Satellite Time-Division Multiple-Access Experiment", *IEEE Transactions on Communication Technology*, Vol. Com-16, No. 4, Aug. 1968, pp. 581-588. In this example, a specific one of plural radio stations serving as a reference station emits control signals indicating time positions on the basis of which another station finds the time position of a channel and follows a procedure to acquire the channel. In such a satellite communication system, since it is possible for every earth station to receive the control signal from the common reference station, all the stations can be given the common frame sync signal.

However, in a mobile communication system, a stationary communication system and the like, all the stations cannot necessarily receive the common signal from the reference station because of a propagation obstruction of an electromagnetic wave.

Furthermore, in case where, as shown in FIG. 2, the communication of a radio station $P_1$ is allowed only to subscribers of the other parties $C_{11}$, $C_{12}$, $C_{13}$ and $C_{22}$ and the area Q in which channels are commonly used is greater than a communication-service available area $S_1$, the station $S_1$ cannot receive all the signals from all the other radio stations $P_2$ and $P_3$. As a result, no particular radio station can serve as a reference station with the result that the communications among the stations become impossible using the TDMA system.

SUMMARY OF THE INVENTION

An object of the present invention is, therefore, to provide a frame synchronizing method and an equipment for use in a TDMA radio communication system which can efficiently allocate channels within a given communication-service available area without relying on a reference station.

The present frame synchronizing method for a time-division multiple-access radio communication system having plural radio channels between plural radio stations and separating the channels from one another on a time-sharing basis, comprises the steps of: enabling one of those radio stations to monitor all the channels upon initiation of a call for communication; acquiring and exclusively occupying one of the channels with its own frame synchronization signal in the case where every channel is unoccupied; acquiring an unoccupied channel synchronized with a burst signal of an occupied channel immediately preceding said unoccupied channel on the time axis under the condition that the occupied channel is followed by said unoccupied channel; and, in the event that the burst signal on said occupied channel disappears during the process of communication, continuing to occupy the same channel with its own frame synchronization signal so that said same channel is slid up or down the time axis to the preceding or following unoccupied time slot and, under the condition that a burst signal appears on another channel ahead on the same time axis of its own channel occupied by the radio station concerned, further continuing to occupy its channel in synchronism with the burst signal.

Also, the present frame synchronizing equipment for use in a time-division multiple-access radio communication system having plural radio channels between plural radio stations and separating the channels from one another on a time-sharing basis comprises means for monitoring every channel upon initiation of a call for communication and for detecting the presence of an unoccupied channel; means responsive to the detection of an occupied channel followed by the unoccupied channel for extracting a pulse in a frame period synchronized with a burst signal of the occupied channel immediately preceding said unoccupied channel on the time axis; and a phase synchronization oscillating circuit for generating a frame synchronization signal in synchronism with said pulse.

BRIEF DESCRIPTION OF THE DRAWINGS

The invention will be described in more detail in conjunction with the accompanying drawings, in which:

FIG. 5 shows one embodiment of the invention;

FIG. 6 shows details of signals in each part of FIG. 5;

FIG. 7 indicates the composition of a burst signal;

FIG. 8 shows details of a receiver 402 of FIG. 4;

DESCRIPTION OF THE PREFERRED EMBODIMENT

Figure 3:
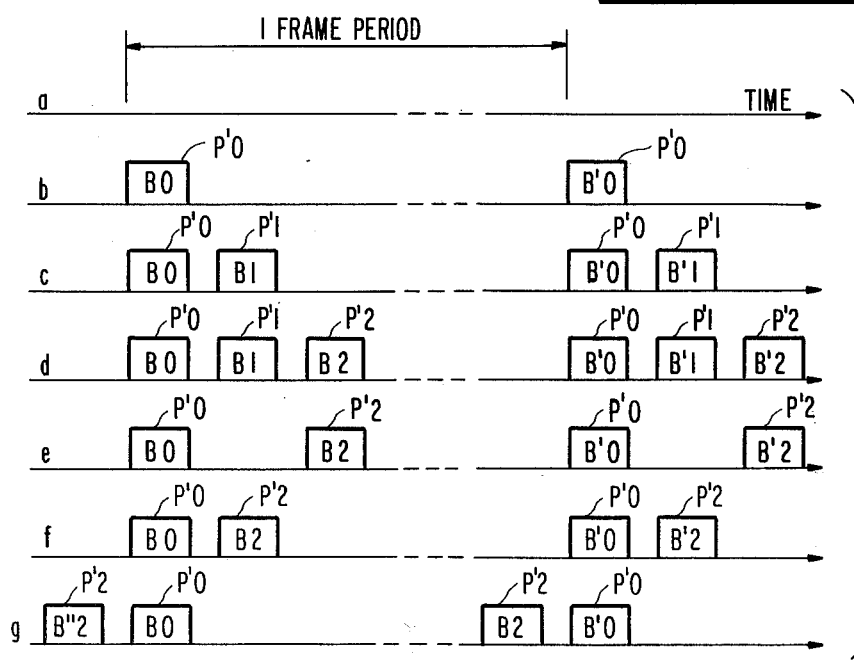
FIG. 3 illustrates how the invention functions.

The principle of operation of the invention will be described with reference to FIGS. 3 (*a*) to (*g*) which illustrate various states of the (radio communication) channel use. FIG. 3 (*a*) shows a state in which no radio station is communicating. If, in this state, a radio station $P'_0$ initiates a call, the station $P'_0$ generates a frame sync signal at its own frequency, because it detects no signal at all, and thereby exclusively acquires a channel $B_0$ as shown in FIG. 3 (b). In this state, when another radio station $P'_1$ initiates a call, the station $P'_1$ detects a burst signal on the channel $B_0$ and an unoccupied time slot following the burst signal. The radio station $P'_1$ generates a frame sync signal in synchronism with that on the channel $B_0$, and acquires another channel $B_1$ in a time slot following the channel $B_0$ as shown in FIG. 3 (c).

Upon call initiation of still another station $P'_2$, the station $P'_2$ acquires still another channel $B_2$ by the same procedure as shown in FIG. 3 (d). This procedure can be repeated until there are no more unoccupied time slots in the frame period.

Next, as soon as the radio station $P'_1$ has finished its communication and as a result there is no longer any signal on the channel $B_1$, the radio station $P'_2$ generates a frame sync signal at its own frequency. Since this frame period is not in tune with that of the radio station $P'_0$, the relative position of the channel $B_0$ to the channel $B_1$ is changed as shown in FIG. 3 (e). Under the condition that the frame period of the radio station $P'_2$ is shorter than that of the radio station $P'_0$, the channel $B_2$ gradually approaches the channel $B_0$. As a result, when the time interval between the channels $B_2$ and $B_0$ becomes shorter than a predetermined length, the radio station $P'_2$ generates a frame sync signal synchronized with those on the channel $B_0$ so as to acquire the channel $B_2$ in a position immediately following the channel $B_0$ as indicated in FIG. 3 (f). While, in case where the frame period of the radio station $P'_2$ is longer than that of the radio station $P'_0$, the channel $B_2$ approaches the channel $B'_0$ in the frame next to the channel $B_0$. As a result, the radio station $P'_0$ generates a frame sync signal in synchronism with that of the channel $B_0$ so that it can acquire the channel $B'_0$ in a position immediately following the channel $B_2$ as seen in FIG. 3 (g). The above description is made, for explanatory convenience, about the case where the frame sync signal given from a radio station is synchronized with that of the channel just before an unoccupied channel or its own channel depending on the initiation or continuation of a call. However, the sync signal may be synchronized with those of other channels than the channel just before an unoccupied channel or its own channel. Moreover, the radio station can monitor a channel in either one direction or channels in both directions when the TDMA system uses two way channels.

Figure 4:
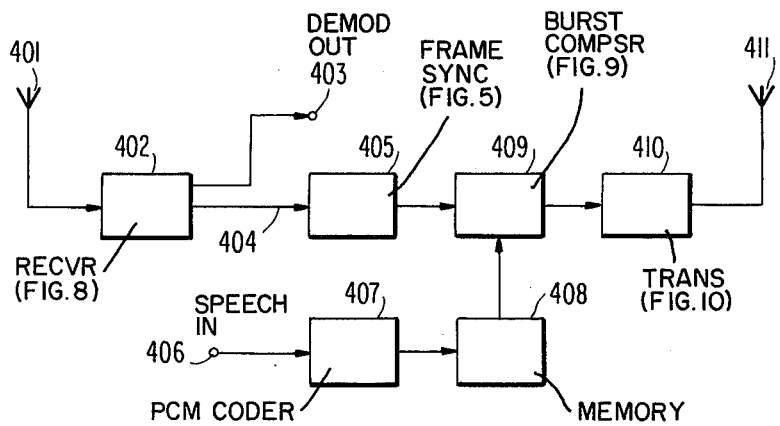
FIG. 4 gives one example of a radio communication system embodying the invention.

FIG. 4 represents a TDMA-based radio communications system in which the frame sync equipment of this invention is used. Immediately after an FSK (frequency shift keying) signal received by a receiving antenna 401 is fed to a receiver unit 402, it appears as a demodulated PCM signal at a demodulating output terminal 403 and, at the same time, a frame sync pulse train is fed to a signal line 404. The frame sync equipment 405 of this invention detects an unoccupied channel out of the frame sync pulse train given to the signal line 404, and generates frame sync pulses for the acquisition of said channel. An analog signal such as a speech signal given to a transmission input terminal 406 is PCM-coded by a PCM coder 407 and stored in a memory 408. The stored PCM signal, to which a preamble word including sync information and data position information is added by a burst composing circuit 409, is fed to a transmitter unit 410 in synchronism with the frame sync pulses generated by the equipment 405, and transmitted from a transmitting antenna 411.

The receiver unit 402 is composed, for instance, as illustrated in FIG. 8. In FIG. 8, an FSK signal from the receiving antenna 401 is fed to a terminal 801 and amplified by an amplifier 802. The amplified signal is mixed with an output of a local oscillator 805 by a mixer 804 through a band pass filter 803, which thereafter takes out an intermediate frequency signal. This intermediate frequency signal enters into a demodulator 810 via an amplifier 807 and a band pass filter 809. The demodulator 810 is matched to the modulation system used. For instance, in the above cited example where the FSK signal is used, a frequency discriminator is employed. An output of the demodulator 810 is sent to a sampling circuit 812 through the low-pass filter 811, and sampled by a clock recovered by a clock recovery circuit 813. The sampling circuit 812 outputs a sampled signal, that is, a demodulated signal, to terminals 815 and 816. Signals derived from the terminals 815 and 816 are fed to the terminals 403 and 404 of FIG. 4, respectively. The sampling circuit 812 and the clock recovery circuit 813 in FIG. 8 are equivalent to the known sampler and clock pulse generator, respectively, referred to in Franks et al, "Statistical Properties of Timing Jitter in PAM Timing Recovery Scheme", *IEEE Transactions on Communications,* Vol. Com-22, No. 7, July 1974, pp. 913–920, specifically to FIG. 1 on page 915.

Figure 9:
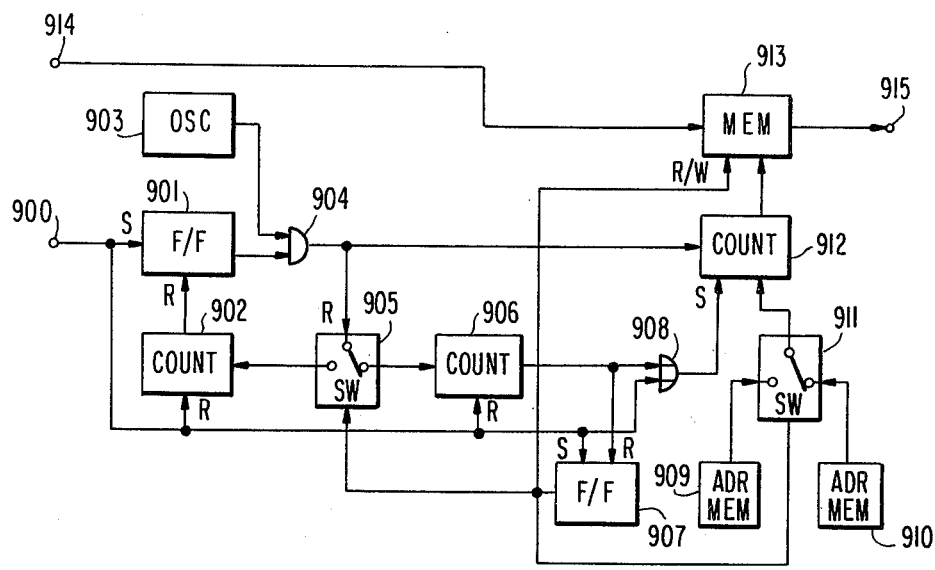
FIG. 9 shows details of a burst composing circuit 409 of FIG. 4.

The burst composing circuit 409 of FIG. 4 is constructed as illustrated in FIG. 9, where the frame sync pulses generated by the present frame sync equipment 405 are given to a terminal 900. Each of the sync pulses sets flip-flops 901 and 907, and resets counters 902 and 906. An output of a clock oscillator 903 is supplied to a switch 905 and a counter 912 through an AND gate circuit 904 only when the flip-flop 901 is set. When the flip-flop 907 is reset, its output turns the switch 905 toward the counter 906 and a switch 911 toward an address memory 910 to ready a memory 913 for writing. The memory 913 is divided into two parts constituted by one storing the preamble word (see FIG. 7) and the other storing data, and their storage start addresses are stored in address memories 909 and 910. Each of the above-mentioned frame sync pulses sets the contents of the address memory 910 in a counter 912 through an OR circuit 908. The counter 912 then counts the addresses of the memory 913 in accordance with an output of the AND gate circuit 904, and successively stores in the memory 913 data from the memory 408 of FIG. 4 supplied to a data input terminal 914. The counters 906 and 912, simultaneously, count the output of the AND gate circuit 904, and, when they have counted the number of data to be written into the memory 913, the counter 906 emits a pulse to reset the flip-flop 907. The reset flip-flop 907 throws the switch 905 toward the counter 906 and the switch 911 toward the address memory 909 to set the memory 913 to ready for reading. The output of the counter 906 sets, through the OR circuit 908, the contents of the address memory 909 in the counter 912, which counts the read-out address of the memory 913 by the output of the gate circuit 904. The contents of the memory 913, from the preamble word to the data, is thereby read out successively and fed to a terminal 915. Soon after the whole data (both the preamble word and the data per se) have been read out, the counter 902 emits a pulse, resets the flip-flop 901, closes the gate circuit 904 and disconnects the output of the clock oscillator 903 to return the burst composing circuit 409 of FIG. 4 to its initial state. By this procedure, the circuit 409 adds a preamble word to the beginning position of data every time a frame sync pulse comes out, and thereby forms a burst signal as illustrated in FIG. 7.

Figure 10:
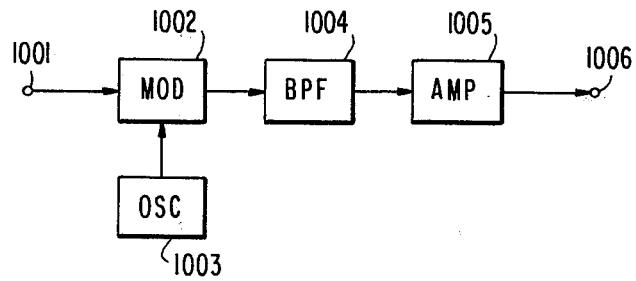
FIG. 10 shows details of a transmitter 410 of FIG. 4.

In the transmitter unit 410 of FIG. 4 composed as illustrated in FIG. 10, the output of the burst composing circuit 409 of FIG. 4 is fed to a modulating terminal 1001 of a modulator (FSK modulator) 1002 in FIG. 10. The modulator 1002 modulates an output of an oscillator 1003 in accordance with the signal fed to the modulating terminal 1001, and the modulated output is given, through a band pass filter 1004, to an amplifier 1005, which amplifies the output and feeds it to an output terminal 1006 connected to the transmitting antenna 411 of FIG. 4.

Referring to FIG. 5 which shows one embodiment of the invention, the frame sync pulse train on the signal line 404 of FIG. 4 is fed to an input terminal 501. In the pulse train, as indicated in FIG. 6 (a), burst signals, each having a length of $T_B$, are present on channels $B_0$, $B_1$, $B_2$, and $B_i$ in use while an unoccupied channel $B_3$ has no signal on it. Each of said burst signals (as illustrated in FIG. 7) has the aforementioned preamble word before data such as a speech signal, and a signal detector 502 detects this preamble word and generates pulses as shown in FIG. 6 (b). A channel timer circuit 503 is reset ($R_1$ and $R_2$ in FIG. 6 (c)) by said pulses (FIG. 6 (b)). The circuit 503 reaches a full count ($F_1$ or $F_2$ in FIG. 6 (c)) to generate a pulse $S_1$ of FIG. 6 (d) on a signal line 504 when a sufficiently long time (for instance, 2 $T_B$ or more has more) to permit establishment of a new channel between other channels already in use. An AND circuit 505 left open as shown in a signal ($G_1$ in FIG. 6 (e)) at the time of initial acquisition of the channel supplies a signal line 506 with the pulse $S_1$ of the signal line 504 as a pulse $Sf_1$. At this moment, a switch 507 is switched to the signal line 506, and supplies a timing circuit 508 with the pulse $Sf_1$ of the signal line 506. After receiving the pulse $Sf_1$, the frame timing circuit 508 produces a signal to keep the gate circuit 505 closed until the time when the same pulse of the next frame is expected. As a result, the gate circuit 505 is opened, as represented by a signal $G_2$ of FIG. 6 (e), at the time when the same signal of the next frame is expected, and the sync pulse f is extracted from the signal ahead of the unoccupied channel and fed to the signal line 506. A phase lock oscillator 509 is actuated in synchronism with the pulse $Sf_1$ of the signal line 506, and feeds to an output terminal 510 frame sync pulses, which are supplied to the burst composing circuit 406 of FIG. 4. The switch 507 is kept switched to the signal line 506 only at the time of the initial acquisition, but at all other times is switched to the output terminal 510 to supply the timing circuit 508 with the frame sync pulses of the output terminal 510 and to open or close the gate circuit 505. When the signal of the channel $B_2$ (FIG. 6 (a)) disappears after the acquisition of the channel, the pulse $S_1$ of FIG. 6 (d) disappears and so does the pulse $Sf_1$ (FIG. 6 (f)). At this instant, the phase lock oscillator 509 begins oscillating at a free oscillation frequency, and generates at the output terminal 510 sync pulses with a frame period which is in synchronism with no other radio station. As a result, the channel $B_3$ of FIG. 6 (a) occupied by this specific radio station shifts in relative position toward the other channels $B_0$ and $B_1$. With the approach of the channel $B_3$ to the channel $B_1$, since a pulse $S_3$ extracted from the burst signal of the channel $B_1$ appears as a pulse $Sf_2$ on the signal line 506 and the phase lock oscillator 509 oscillates in synchronism with the pulse $Sf_2$ from the channel $B_1$ to give the frame sync pulses, this radio station occupies the channel $B_3$ synchronized with the channel $B_1$. On the other hand, in the case where the channel $B_1$ approaches the channel $B_i$, the channel $B_i$ occupies its own channel synchronized with the channel $B_3$.

By the above described procedure, the frame sync equipment of the present invention makes possible frame synchronization with the signal of a channel ahead of the channel occupied by a given radio station.

Figure 11:
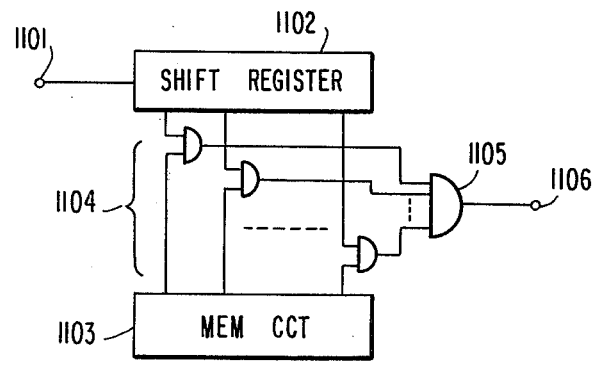
FIG. 11 shows details of a signal detecting circuit 502 of FIG. 5.

The signal detector 502 of FIG. 5 is composed as illustrated in FIG. 11. The frame sync pulse train given to a terminal 1101 is further sent to a shift register 1102, and successively shifted from left to right. A predetermined code in the preamble word is stored in a memory circuit 1103 of which the contents of each stage are fed to AND gate circuits 1104 together with the contents of each stage of a shift register 1102 and supplied to an AND gate circuit 1105. The AND gate circuit 1105 feeds to a terminal 1106 a pulse only when an output of every one of the AND gate circuits 1104 is 1, or when the input code of the terminal 1101 is coincident with the contents of the memory circuit 1103. A terminal 1106 is connected to the timer circuit 503 of FIG. 5.

Figure 1:
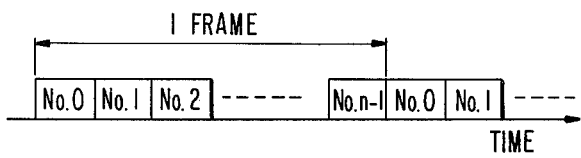
FIG. 1 shows a channel composition in the TDMA system.
Figure 2:
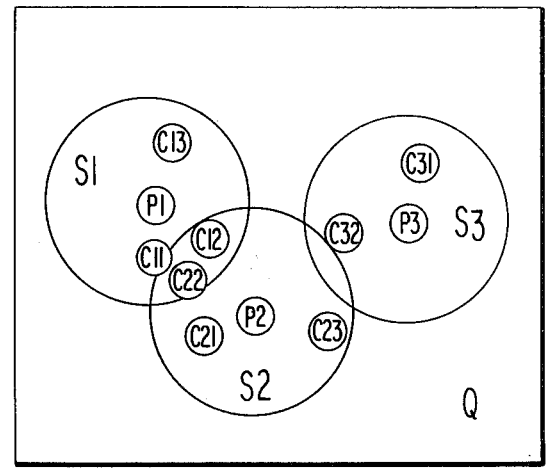
FIG. 2 shows a state of subscribers to which the invention is applicable.

For details of the phase lock oscillator 509 of FIG. 9, reference is made to Byrne, "Properties and Design of the Phase-Controlled Oscillator with a Sawtooth Comparator", *The Bell System Technical Journal*, March 1962 issue, pp. 559-602, specifically to FIG. 1 on p. 561.

The signal detector 502 for detecting a burst signal by the preamble in this embodiment can be replaced with a circuit which does the same by the presence or absence of an electromagnetic wave. In this instance, the timer circuit 503 may be so designed as to reach full count only when no electromagentic wave is present for at least the length of the burst signal ($T_B$).

Whereas the above described implementation is based on an FSK modulation system, the use of any other modulation system such as ASK (amplitude shift keying) or PSK (phase shift keying) will merely result in a different structure of the modulator-demodulator, but not affect what is claimed to be the extent of this invention.

As described above in detail, the present invention enables the TDMA technique to be used in a mobile communication system or a small-scale stationary communication system, requires no reference station, and moreover, facilitates simplification and digitalization of radio communication systems.

What is claimed is:

1. A frame synchronizing method for a time-division multiple-access radio communication system having plural radio channels between plural radio stations and separating the channels from one another on a time-sharing basis, comprising the steps of: enabling one of said plural radio stations to monitor all the channels upon initiation of a call for communication; acquiring and exclusively occupying one of the channels with its own frame synchronization signal in the case where every channel is unoccupied; acquiring an unoccupied channel synchronized with a burst signal of an occupied channel immediately preceding said unoccupied channel on the time axis under the condition that the occupied channel is followed by said unoccupied channel; and, in the event that the burst signal on said occupied channel disappears during the process of communication, continuing to occupy the same channel with its own frame synchronization signal so that said same channel is slid up or down the time axis to the preceding or following unoccupied time slot and, under the condition that a burst signal appears on another channel ahead on the same time axis of its own channel occupied by the radio station concerned, further continuing to occupy its channel in synchronism with the burst signal.

2. A frame synchronizing equipment for use in a time-division multiple-access radio communication system having plural radio channels between plural radio stations and separating the channels from one another on a time-sharing basis comprising: means for monitoring every channel upon initiation of a call for communication and for detecting the presence of an unoccupied channel; means responsive to the detection of an occupied channel followed by the unoccupied channel for extracting a pulse in a frame period synchronized with a burst signal of the occupied channel immediately preceding said unoccupied channel on the time axis; means responsive to the termination of the burst signal of the occupied channel for extracting another pulse in the frame period synchronized with the frame synchronization signal of said unoccupied channel; and a phase synchronization oscillating circuit for generating frame synchronization signals in synchronism with said pulses.

3. A frame synchronizing equipment as recited in claim 2 wherein said means for monitoring comprises a signal detector for detecting the presence of a signal and generating an output pulse, and channel timing means reset by output pulses from said signal detector and producing a timing pulse indicating the presence of an unoccupied channel.

4. A frame synchronizing equipment as recited in claim 3 wherein said means for extracting comprises an AND gate receiving as one input said timing pulse and providing an output to said phase synchronization oscillating circuit, and a frame timing means initially responsive to the output of said AND gate for enabling said AND gate until said timing pulse passes said AND gate and thereafter responsive to the output of said phase synchronization oscillating circuit for enabling said AND gate at the time when said timing pulse of the next frame is expected.

* * * * *

UNITED STATES PATENT AND TRADEMARK OFFICE
CERTIFICATE OF CORRECTION

PATENT NO. : 4,129,755
DATED : December 12, 1978
INVENTOR(S) : Shuji MURAKAMI

It is certified that error appears in the above–identified patent and that said Letters Patent are hereby corrected as shown below:

IN THE SPECIFICATION:

Column 5, line 29 - after "more" insert -- ) -- line 30 - delete "has more)" insert -- has elapsed --

Signed and Sealed this

Twelfth Day of June 1979

[SEAL]

Attest:

RUTH C. MASON
*Attesting Officer*

DONALD W. BANNER
*Commissioner of Patents and Trademarks*